United States Patent
Morrow et al.

(10) Patent No.: US 6,495,280 B2
(45) Date of Patent: Dec. 17, 2002

(54) CONVEX FUEL MANIFOLD PROVIDING UNIFORM PRESSURE SEAL TO FUEL CELL STACK

(75) Inventors: Aaron W. Morrow, Vernon, CT (US); Joseph M. Sipitkowski, Southampton, MA (US); Jeffrey G. Lake, Vernon, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 50 days.

(21) Appl. No.: 09/838,877

(22) Filed: Apr. 20, 2001

(65) Prior Publication Data

US 2002/0155337 A1 Oct. 24, 2002

(51) Int. Cl.[7] ................................................. H01M 8/02
(52) U.S. Cl. ............................................. 429/35; 429/37
(58) Field of Search ............................... 429/34, 35, 38, 429/39, 37

(56) References Cited

U.S. PATENT DOCUMENTS 5,750,281 A * 5/1998 Washington et al. .......... 429/34

* cited by examiner

Primary Examiner—Patrick Ryan
Assistant Examiner—M. Wills
(74) Attorney, Agent, or Firm—M. P. Williams

(57) ABSTRACT

A reactant gas manifold (6), to be used with a fuel cell stack (17) having a flat seal surface (16), is provided with a convex seal surface (13) so that when the manifold (6) is distorted by being bolted (20) to the fuel cell stack, the distortion will provide substantially uniform seal pressure along the length of the seal between the surfaces (13, 16).

3 Claims, 2 Drawing Sheets

CONVEX FUEL MANIFOLD PROVIDING UNIFORM PRESSURE SEAL TO FUEL CELL STACK

TECHNICAL FIELD

This invention relates to reactant gas manifolds for fuel cell stacks having an initial convex shape which distorts when bolted to the fuel cell stack to provide a substantially uniform seal pressure along the length of the manifold.

BACKGROUND ART

Fuel cell stacks which utilize gaseous reactants conventionally are provided with opposed pairs of external manifolds which distribute the reactant gases to the cells in the stack, and which gather reactant exhaust gases from the cells in the stack. In the larger commercial stacks, the manifolds may take the form of large shells which abut the sides of the stack and are secured in place by some sort of fastening means. U.S. Pat. No. 4,345,009 is illustrative of such a commercial stack and manifold construction.

When this type of construction is used, care must be taken to seal the edges of the manifold against the stack so that the reactant gases and the exhaust gases will not escape into the ambient surroundings. This seal has been effected with elastomeric gaskets and also with elastomeric adhesive gaskets. The elastomeric gaskets rely on the compression forces of the mechanism which secures the manifold to the stack for their integrity. The elastomeric adhesive gaskets provide a more stable seal because they rely on compressive forces plus adhesion to the stack and to the manifold for their integrity.

Common practice has been to provide fuel cell manifolds with extremely flat sealing surfaces. However, even when elastomeric adhesive gaskets are employed, complex load retention systems are still required to obtain uniform pressure along the length of the manifold seal.

DISCLOSURE OF INVENTION

Objects of the invention include: provision of a fuel cell reactant gas manifold which inherently provides a more uniform pressure along the length of the seal between the manifold and the fuel cell stack; a fuel cell reactant gas manifold which simplifies manufacture and assembly and reduces cost of producing fuel cells; and a fuel cell stack having better seals between the stack and the reactant gas manifolds.

According to the present invention, a manifold for reactant gases of a fuel cell stack is produced with a convex sealing surface in at least one dimension; distortion of the manifold when bolted to the fuel cell stack straightening the convex surfaces and providing a substantially uniform pressure seal along the length of the manifold-stack interface. The invention is particularly suited for use where it is difficult or impossible to establish a bolt line along the seal.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
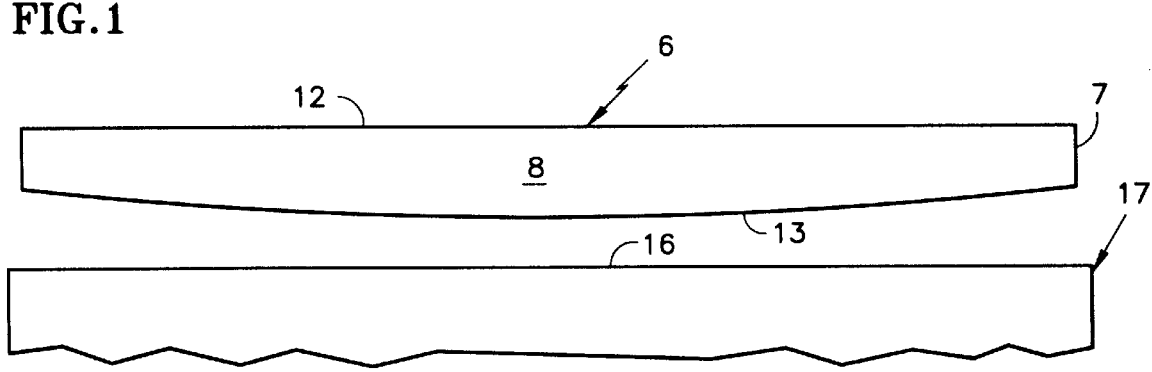
FIG. 1 is a simplified, stylized side elevation view of a manifold and cell stack in accordance with the present invention, before the manifold is bolted to the cell stack.
Figure 3:
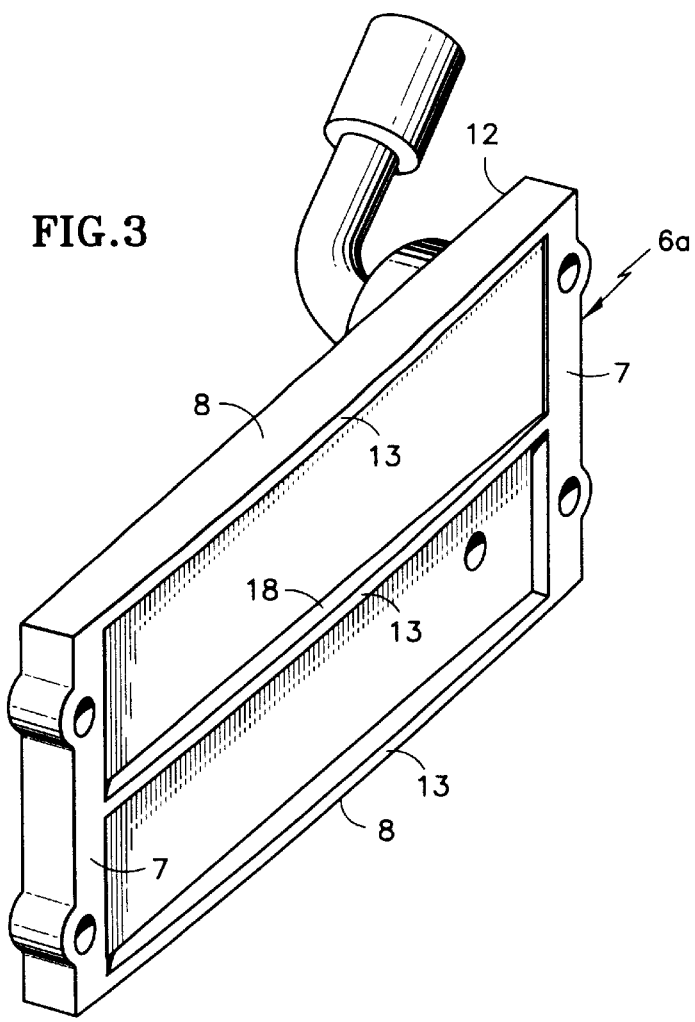
FIG. 3 is a simplified perspective view of a fuel inlet/outlet manifold, according to the invention.
Figure 4:
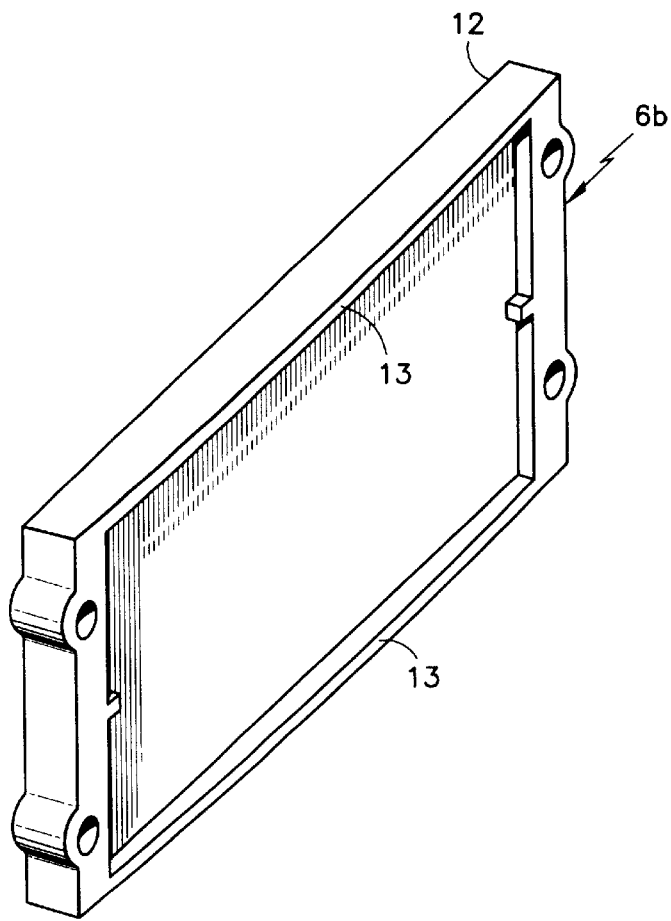
FIG. 4 is a simplified perspective view of a fuel turn-around manifold, according to the invention.

FIG. 1 is a simplified illustration of the present invention in which a manifold 6 having short ends 7 and long sides 8 is formed with a flat upper surface 12 and a convex lower surfaces 13, for such surfaces as are to form a seal with a corresponding surface 16 of the fuel cell stack 17. The convex surfaces are illustrated as part of a fuel inlet/outlet manifold 6a having a midwall 18, in FIG. 3, and as part of a fuel turn-around manifold 6b, in FIG. 4.

Figure 2:
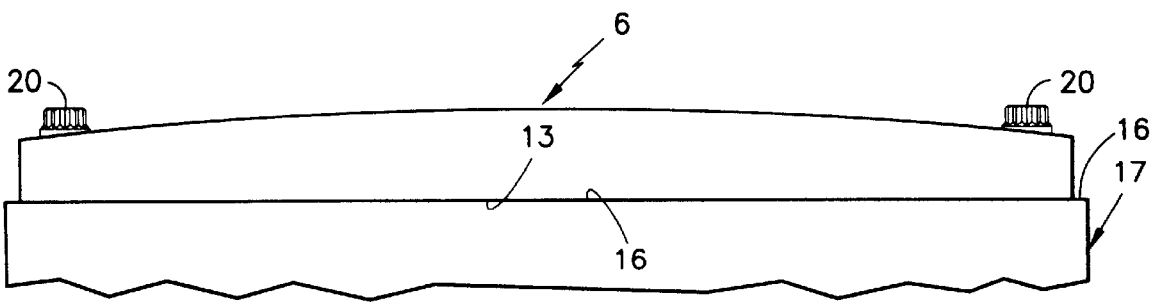
FIG. 2 is a simplified, stylized side elevation view of a manifold and cell stack in accordance with the present invention, after the manifold is bolted to the cell stack.

As seen in FIG. 2, when the manifold 6 is drawn tightly to the cell stack 17, such as by bolts 20, the surface 13 becomes flat, mating perfectly with the flat surface 16 of the cell stack.

The manifold is preferably made from a reinforced plastic, such as a composition consisting of glass fibers as the reinforcement and epoxy as the plastic. However, any plastic and filler may be used so long as the composition is compatible with the chemical and operating environment of the fuel cell with which the manifold is to be utilized. Depending on the length of the seals, the thickness of the manifold, and the resilient characteristics of the composition, the curvature of the surface 13 can be determined so that when there is the desired pressure beneath the bolts 20, that same pressure will be maintained substantially across the length of the seal between the surfaces 13, 16.

The invention eliminates the need for an obtuse manifold load retention system, thereby reducing costs, weight and difficulty of assembly.

The aforementioned patent is incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A reactant gas manifold for a fuel cell stack assembly having a generally planar configuration with two opposing long sides joined together by two opposing short ends, the sides and ends having substantially smooth surfaces for sealing against a fuel cell stack, characterized by:

said surfaces of said long sides being convex, whereby when the manifold distorts as a consequence of said short ends being bolted to a fuel cell stack, the sealing surfaces of the long sides will provide substantially uniform sealing pressure throughout the length thereof.

2. A manifold according to claim 1 wherein:

the thickness of said manifold is greater in the center of said long sides than at the ends.

3. A manifold according to claim 1, further comprising:

a midwall parallel to and between either said long sides or said short ends and having a convex sealing surface coaligned with the convex sealing surfaces of said sides.

* * * * *